United States Patent
Hirota et al.

(10) Patent No.: US 6,912,068 B1
(45) Date of Patent: Jun. 28, 2005

(54) IMAGE PROCESSOR, IMAGE PROCESSING METHOD, AND PROGRAM PRODUCT STORING PROGURAM FOR CONTROLLING THE IMAGE PROCESSOR METHOD

(75) Inventors: Yoshihiko Hirota, Toyokawa (JP); Keisuke Hashimoto, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/532,304

(22) Filed: Mar. 22, 2000

(30) Foreign Application Priority Data

Mar. 31, 1999 (JP) .......................................... 11-091823

(51) Int. Cl.[7] .......................... H04N 1/405; H04N 1/409
(52) U.S. Cl. ..................................... 358/3.05; 358/3.26
(58) Field of Search ............................. 358/3.03, 3.04, 358/3.05, 3.26, 1.9; 382/252

(56) References Cited

U.S. PATENT DOCUMENTS

| | | | | |
|---|---|---|---|---|
| 5,153,925 A | * | 10/1992 | Tanioka et al. | 382/252 |
| 5,530,561 A | * | 6/1996 | Shimazaki | 358/3.03 |
| 5,577,136 A | * | 11/1996 | Tanioka et al. | 382/252 |
| 5,757,976 A | * | 5/1998 | Shu | 382/252 |
| 5,809,177 A | * | 9/1998 | Metcalfe et al. | 358/3.05 |
| 5,835,687 A | * | 11/1998 | Brown et al. | 358/3.04 |
| 5,880,857 A | * | 3/1999 | Shiau et al. | 358/3.03 |
| 6,201,612 B1 | * | 3/2001 | Matsushiro et al. | 358/1.9 |
| 6,449,061 B2 | * | 9/2002 | Metcalfe | 358/3.05 |
| 6,519,366 B1 | * | 2/2003 | Kaburagi | 358/465 |
| 6,552,824 B2 | * | 4/2003 | Rombola et al. | 358/3.14 |
| 2001/0021041 A1 | * | 9/2001 | Suzuki | 358/458 |

FOREIGN PATENT DOCUMENTS

| | | |
|---|---|---|
| JP | 10-282390 | 10/1998 |
| JP | 11-88665 | 3/1999 |

* cited by examiner

Primary Examiner—Scott A. Rogers
(74) Attorney, Agent, or Firm—Morrison & Foerster LLP

(57) ABSTRACT

An image processor performs multilevel error diffusion processing and is provided with: a quantizing unit that quantizes pixel data constituting image information based on output values distributed at predetermined tone differences; an error detecting unit that detects a quantization error of the pixel data; a peripheral error calculating unit that integrates the quantization error of the pixel data detected by the error detecting unit with respect to a quantization error of peripheral pixel data; and an error superimposing unit that adds the integration error calculated by the peripheral error calculating unit to the pixel data input next. The image processor is further provided with: a random noise generating unit that generates random noise in accordance with the tone level of the input pixel data; and a noise superimposing unit that superimposes the random noise generated by the random noise generating unit on the pixel data.

10 Claims, 4 Drawing Sheets

IMAGE PROCESSOR, IMAGE PROCESSING METHOD, AND PROGRAM PRODUCT STORING PROGURAM FOR CONTROLLING THE IMAGE PROCESSOR METHOD

CROSS-REFERENCE TO RELATED APPLICATIONS

This application is based on Application No. HEI 11-091823 filed in Japan, the content of which is hereby incorporated by reference.

BACKGROUND OF THE INVENTION

1. Field of the Invention

The present invention relates to an image processor being incorporated, for example, in a digital copier, and outputting input image information after processing it, an image processing method thereof, and a storage medium in which a program therefor is stored.

2. Description of the Related Art

In an image processor being incorporated, for example, in a digital copier, and outputting image information input from an image input device such as a scanner or a personal computer after processing it, an image processing method thereof and a storage medium in which a program therefor is stored, generally, pseudo tone processing is performed in order to reduce the load on the memory and increase the data processing speed. Conventionally, as such a pseudo tone processing, multilevel error diffusion processing is well known in which analog continuous tone input data is replaced with predetermined number of gradations by quantizing it into absolute tone data distributed at fixed tone differences, thereby reducing the amount of data to be processed.

In the previously known multilevel error diffusion processing, normally, the error diffusion processing is performed on pixel data constituting an image and successively input from an image input device irrespective of the tone level. Moreover, in the conventional multilevel error diffusion processing, random noise or dither noise is added to the threshold value level in error detection. According to such a processing method, the result of the pseudo tone processing is not excellent in a highlighted area and a high-density area, character edge jaggies are noticeable and the result of pseudo tone is not excellent in color superimposition.

SUMMARY OF THE INVENTION

In view of the above-mentioned problems, an object of the present invention is to provide an image processor capable of suppressing texture, for example, jaggies (hereinafter, referred to as pseudo tone phenomenon) due to the multilevel error diffusion processing, an image processing method thereof, and a program product in which a program therefor is stored.

An image processor according to the present invention is provided with a multilevel error diffusion processing unit comprising: a quantizing unit that quantizes successively input pixel data based on output values distributed at predetermined tone differences; a quantization error detecting unit that detects an error of quantization of the pixel data; a peripheral error calculating unit that integrates the error of quantization of the pixel data detected by the quantization error detecting unit with respect to an error of quantization of peripheral pixel data; and an error superimposing unit that feedback-adds an integration error calculated by the peripheral error calculating unit to pixel data input next. The image processor is also provided with: a random noise generating unit that generates random noise in accordance with a tone level of the input pixel data; and a noise superimposing unit that superimposes random noise generated by the random noise generating unit on the pixel data before multilevel error diffusion processing is performed on the pixel data by the multilevel error diffusion processing unit.

Moreover, the quantizing unit of the image processor according to the present invention quantizes the pixel data based on a plurality of reference levels so that tone reproduction data output to an outside has at least two tone levels.

Moreover, the reference levels of the image processor according to the present invention are set so that a tone width of a plurality of areas divided based on the reference levels increases with the tone level and is narrow in a highlighted area where the tone level is highest.

Moreover, each of the pixel data of the image processor according to the present invention has a tone level corresponding to an area.

Moreover, the image processor according to the present invention is provided with: simply quantizing unit that quantizes pixel data on which the random noise is not superimposed; and a selector that selects either one of multilevel-error-diffusion-processed pixel data and simply quantized pixel data in accordance with an attribute of the pixel data, and outputs the selected data as tone reproduction data.

Moreover, the selector of the image processor according to the present invention selects the simply quantized pixel data when the attribute of the pixel data is a character edge Moreover, for the input pixel data, the random noise of the image processor according to the present invention is generated, for each pixel data, with a noise component having a fixed amplitude component and a noise component whose amplitude is proportional to the tone level of the input pixel data.

Moreover, the successively input pixel data of the image processor according to the present invention comprise a plurality of color data necessary for color reproduction, and the random noise is generated for each color.

Moreover, an image processing method according to the present invention comprises the steps of: quantizing successively input pixel data based on output values distributed at predetermined tone differences; detecting an error of quantization of the pixel data; integrating the detected error of quantization of the pixel data with respect to an error of quantization of peripheral pixel data; feedback-adding the calculated integration error to pixel data input next; generating random noise in accordance with a tone level of the input pixel data; and superimposing the generated random noise on the pixel data before the pixel data is quantized.

Moreover, a program product according to the present invention is a computer-readable program product that a program for controlling an image processor so as to execute the steps of the image processing method.

BRIEF DESCRIPTION OF THE DRAWINGS

These and other objects and features of the present invention will become apparent from the following description of the preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

Hereinafter, an embodiment of the present invention will be described with reference to the accompanying drawings.

Figure 1:
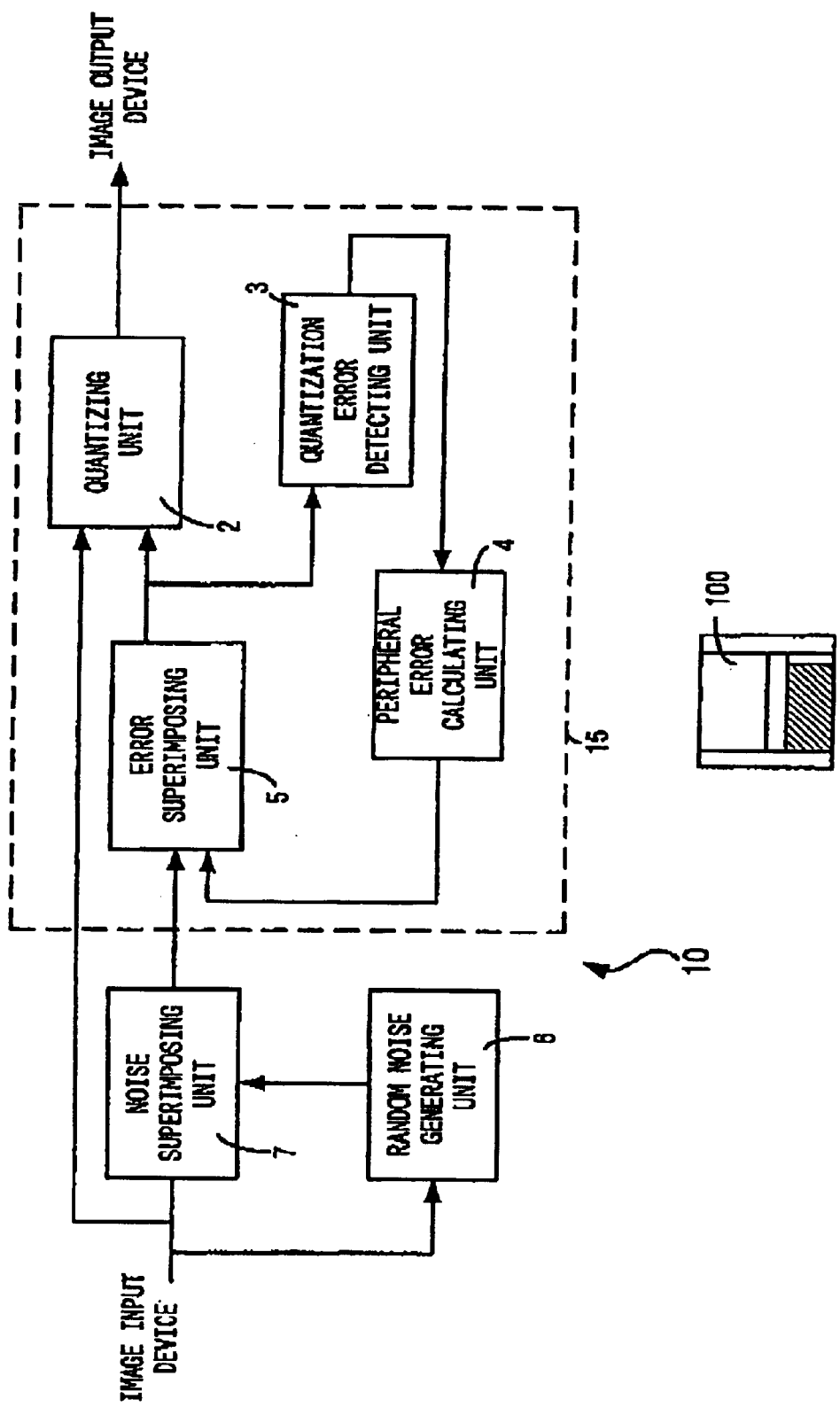
FIG. 1 is a block diagram showing the structure of an image processor according to an embodiment of the present invention.

FIG. 1 is a block diagram schematically showing the structure of an image processor according to an embodiment of the present invention. The image processor 10 is incorporated, for example, in a digital copier, receives digital image information output from an image input device such as an original reader (so-called scanner) or a computer, and outputs the digital image information to an image output device after performing predetermined multilevel error diffusion processing thereon.

The image processor 10 has as the basic structure: a multilevel error diffusion processing unit 15 comprising a quantizing unit 2 (comprising coding tables 2A and 2B) that quantizes pixel data constituting image information based on output values distributed at predetermined tone differences, a quantization error detecting unit 3 that detects the quantization error of the pixel data, a peripheral error calculating unit 4 that integrates the quantization error of the pixel data detected by the quantization error detecting unit 3 with respect to the quantization error of peripheral pixel data, and an error superimposing unit 5 that feedback-adds the integration error calculated by the peripheral error calculating unit 4 to the pixel data input next; a random noise generating unit 6 that generates random noise in accordance with the tone level of the pixel data; and a noise superimposing unit 7 that superimposes the random noise generated by the random noise generating unit 6 on the pixel data. A floppy disk 100 is a program product in which software to be installed on the image processor 10 is stored. In the floppy disk 100, processing of the image processor 10 described below with reference to FIGS. 2 to 4 is stored, and installing the program on the image processor 10 enables the image processor 10 to perform the processing shown in FIGS. 2 to 4.

Figure 2:
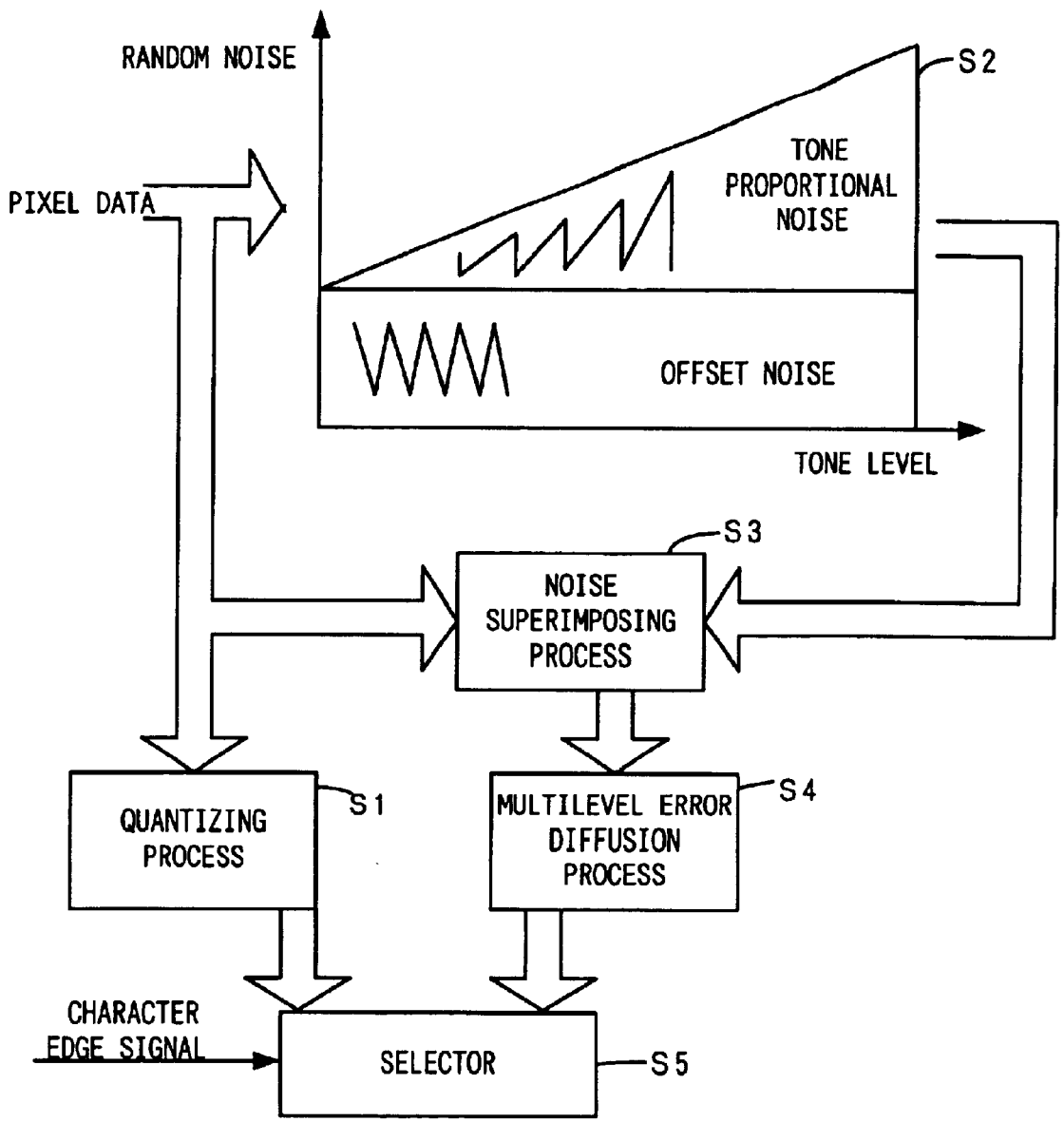
FIG. 2 is an explanatory view showing the flow of data processing performed by the image processor.

Referring to FIG. 2, the flow of the data processing performed by the image processor 10 having the above-described structure will be described. Some of the pixel data successively input from the image input device are immediately quantized into absolute tone data distributed at fixed tone differences (S1). Some of other pixel data are sent to the random noise generating unit 6, and random noise is generated in accordance with the pixel data (S2). As is apparent from the figure, the random noise comprises tone proportional noise proportional to the tone of the pixel data and offset noise having fixed amplitude. In the image processor 10, random noise particular to each pixel data is generated in accordance with the tone level of the input pixel data. The random noise is added to the pixel data input to the image processor 10 at S3. Consequently, granularity in a highlighted area of the image constituted by the pixel data is maintained, and the pseudo tone phenomenon in a high-density area is suppressed.

Then, multilevel error diffusion processing is performed on the pixel data on which the random noise was superimposed at S3 (S4). Consequently, the analog continuous tone pixel data are quantized into absolute tone data distributed at fixed tone differences.

Figure 3:
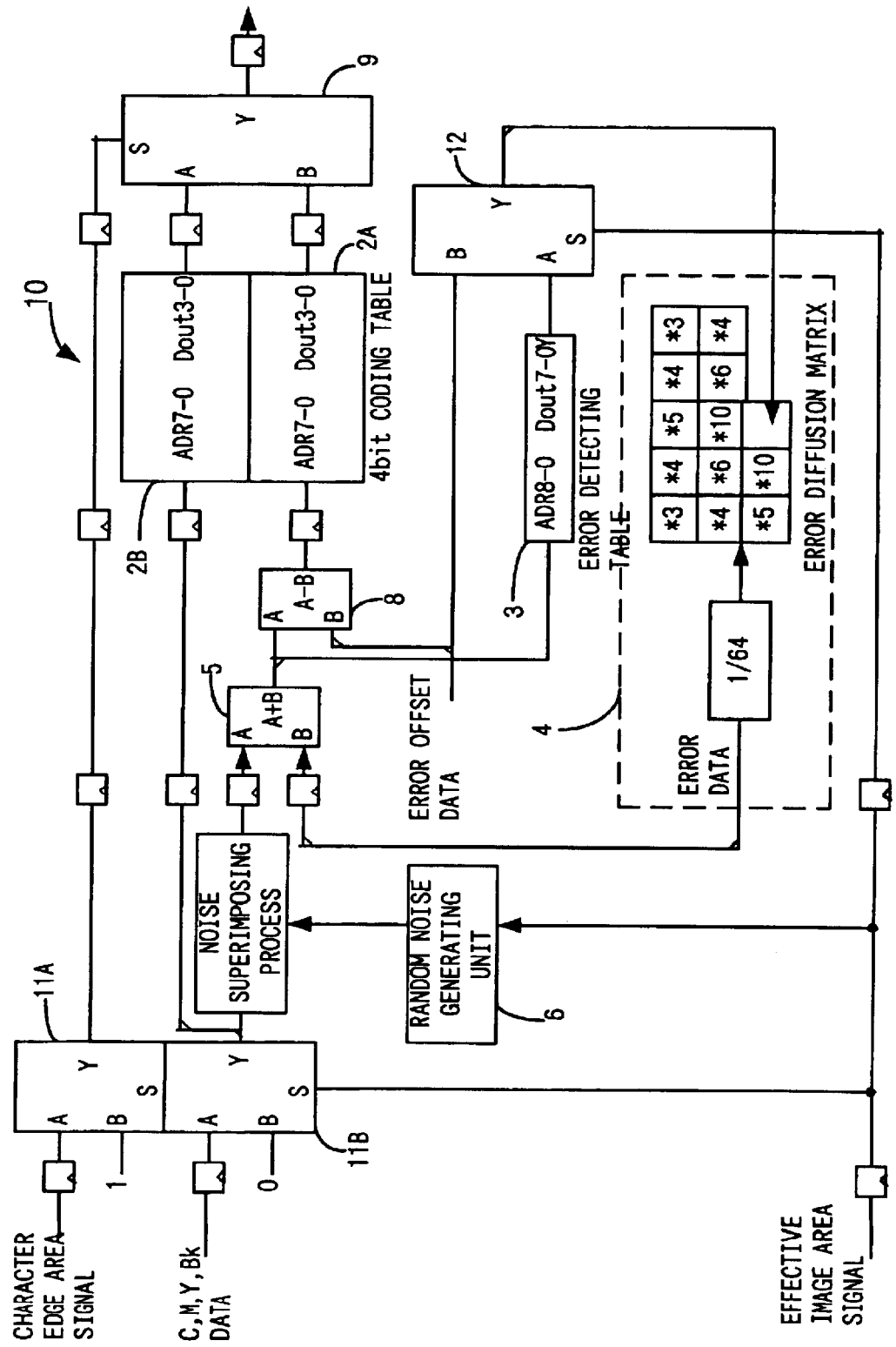
FIG. 3 is an explanatory view showing a more detailed structure of the image processor.
Figure 4:
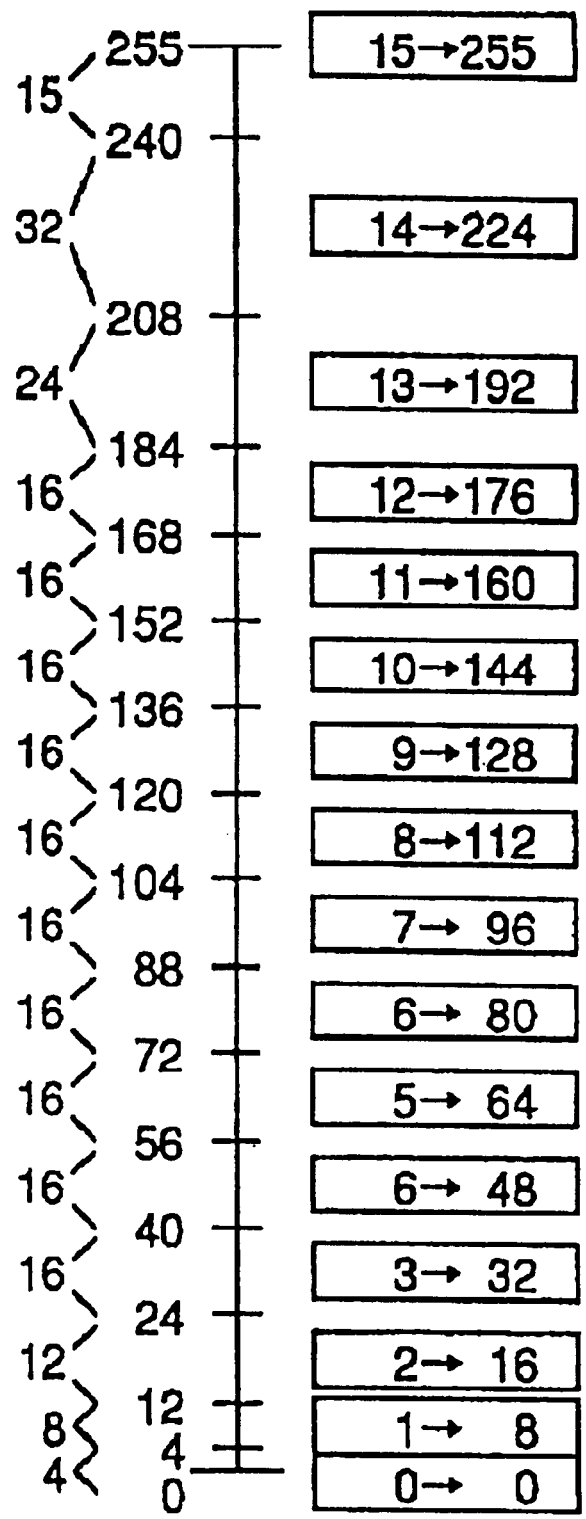
FIG. 4 shows an example of the tone quantization level setting in a quantizing unit according to the embodiment.

At S5, the pixel data quantized at S4 or the pixel data simply quantized at S1 are selected by a selector 9 shown in FIG. 3 based on the pixel data attribute information of a character edge area signal, and are output to the image output device.

FIG. 3 is an explanatory view showing a more detailed structure of the image processor 10. Referring to FIG. 3, the pixel data processing performed by the image processor 10 will be described.

To the image processor 10, first, color data of cyan (C) magenta (M), yellow (Y) and black (Bk) constituting an image, as well as a character edge area signal and an effective image area signal, are input from the image input device. The input color data and character edge area signal are sent to selectors 11A and 11B, respectively. At the selectors 11A and 11B, data are selected based on the effective image area signal and the selected data are output. The data output from the selector 11A is directly sent to the selector 9 described at S5 of FIG. 2. The data output from the selector 11B is split into two parts; one is sent to the noise superimposing unit 7 and the other is directly sent to the coding table 2B of the quantizing unit 2 (see FIG. 1).

At the noise superimposing unit 7, the random noise generated by the random noise generating unit 6 is added in accordance with the tone level of the effective image area signal. The input pixel data comprises a plurality of color data necessary for color reproduction. At the random noise generating unit 6, random noise is generated for each color. This suppresses the pseudo tone phenomenon in color superimposition.

The pixel data output from the noise superimposing unit 7 is first sent to the error superimposing unit 5. At the error superimposing unit 5, the error data calculated by the peripheral error calculating unit 4 with respect to a plurality of previously input pixel data is feedback-added to the input pixel data. The data output from the error superimposing unit 5 is sent to an error offset subtracting unit 8 and a quantization error detecting table 3.

To the error offset subtracting unit 8, the data output from the error superimposing unit 5 and error offset data are input, and the error offset data is subtracted from the pixel data to which the error data was added at the error superimposing unit 5. The pixel data from which the error offset data has been subtracted is sent to the coding table 2A of the quantizing unit 2.

At the quantization error detecting table 3, a quantization error is detected with respect to the pixel data from the error superimposition unit 5. The image processor 10 is provided with an output selector 12 that receives the quantization error and the error offset data. The output selector 12 selects either one of them based on the effective image area signal input to the image processor 10, and outputs the selected one to the peripheral error calculating unit 4.

At the peripheral error calculating unit 4, the quantization error sent from the output selector 12 and a predetermined number of previously processed quantization errors are integrated, whereby the error data to be added to the pixel data input next is calculated at the error superimposing unit 5.

As is apparent from the figure, in the peripheral error calculating unit 4, an error diffusion matrix comprising a plurality of rows (three rows in this embodiment) of matrix coefficients is set. In this embodiment, the quantization errors previously sent from the output selector 12 are stored with respect to the upper two rows of the rows of the matrix coefficients.

In the quantization error integration, the quantization error from the output selector 12 and the previously sent quantization errors are successively assigned to the matrix coefficients of the error diffusion matrix. Thus, the error data calculated by the peripheral error calculating unit 4 is output to the error superimposing unit 5 and feedback-added to the pixel data input next.

As described above, in the image processor 10, by modulating the random noise added to the input pixel data with respect to the amplitude thereof in accordance with the tone level of the pixel data and performing different data control for each pixel data, the pseudo tone phenomenon due to the multilevel error diffusion processing can be suppressed. Moreover, for example, with respect to pixel data of the edges of characters or the like, by performing simple quantization without superimposing the random noise, the jaggies of edges in the image can be suppressed.

FIG. 4 shows an example of the tone quantization level setting in the quantizing unit 2. At the quantizing unit 2 comprising the coding tables 2A and 2B, quantization based a plurality of reference levels is performed, and the tone reproduction data output therefrom is processed so as to have two or more tone levels.

In this embodiment, in the coding tables 2A and 2B, tone levels 0 to 255 are divided into 16 areas by setting boundary values 0, 4, 12, 24, 40, 56, 72, 88, 104, 120, 136, 152, 168, 184, 208, 240 and 255. These 16 areas correspond to output codes 0 to 15, and each input pixel data is assigned to one of the output codes 0 to 15 based on the tone level. The tone widths of the areas are, in increasing order of level, 4, 8, 12, 16, 16, 16, 16, 16, 16, 16, 16, 16, 16, 24, 32, and 15. The tone width is set so as to increase with the tone level and to be narrow in a highlighted area (i.e. the area corresponding to the output code 15) where the tone is highest.

In outputting data, the pixel data assigned to the output codes 0 to 15 are output as pixel data having tone levels 0, 8, 16, 32, 48, 64, 80, 96, 112, 128, 144, 160, 176, 192, 224 and 255.

As described above, by setting the tone width so as to be narrow in a highlighted area where the tone is highest in the quantizing unit 2, the pseudo tone in the highlighted area can be suppressed.

It is to be noted that the present invention is not limited to the illustrated embodiment but various improvements and design modifications are possible without departing from the gist of the invention.

As is apparent from the description given above, according to the invention of this application, by modulating the random noise added to the input pixel data with respect to the amplitude thereof in accordance with the tone level of the pixel data and performing different data control for each pixel data, the pseudo tone phenomenon due to the multilevel error diffusion processing can be suppressed.

Moreover, according to the invention of this application, since the quantizing unit quantizes the pixel data based on a plurality of reference levels, the tone reproduction data output to the outside is enabled to have two or more tone levels.

Further, according to the invention of this application, since the pixel data of edges of characters or the like are output after being simply quantized without the random noise added thereto in accordance with the pixel data attribute information, jaggies of edges in the image can be suppressed.

Further, according to the invention of this application, since the random noise is generated with a noise component having a fixed amplitude component and a noise component whose amplitude is proportional to the tone level of the input pixel data in accordance with the tone level of the input pixel data, granularity in a highlighted area of the image is maintained and the pseudo tone phenomenon in a high-density area can be suppressed.

Further, according to the invention of this application, since the successively input pixel data have a plurality of color data necessary for color reproduction and the random noise is generated for each color, the pseudo tone phenomenon in color superimposition can be suppressed.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processor comprising:

a multilevel error diffusion processing unit comprising:

a quantizing unit that quantizes successively input pixel data based on output values distributed at predetermined tone differences;

a quantization error detecting unit that detects an error of quantization of the pixel data;

a peripheral error calculating unit that integrates the error of quantization of the pixel data detected by said quantization error detecting unit with respect to an error of quantization of peripheral pixel data; and an error superimposing unit that feedback-adds an integration error calculated by said peripheral error calculating unit to pixel data input next;

a random noise generating unit that generates random noise in accordance with a tone level of the input pixel data; and a noise superimposing unit that superimposes random noise generated by said random noise generating unit on the pixel data before multilevel error diffusion processing is performed on the pixel data by said multilevel error diffusion processing unit, wherein said quantizing unit quantizes the pixel data based on a plurality of reference levels so that tone reproduction data output to an outside has at least two tone levels, wherein said reference levels are set so that a tone width of a plurality of areas divided based on the reference levels increases with the tone level and is narrow in a highlighted area where the tone level is highest.

2. An image processor as claimed in claim 1, wherein each of the pixel data has a tone level corresponding to an area.

3. An image processor as claimed in claim 1, further comprising:

a simply quantizing unit that quantizes pixel data on which the random noise is not superimposed; and a selector that selects either one of multilevel-error-diffusion-processed pixel data and simply quantized pixel data in accordance with an attribute of the pixel data, and outputs the selected data as tone reproduction data.

4. An image processor as claimed in claim 3, wherein when the attribute of the pixel data is a character edge, said selector selects the simply quantized pixel data.

5. An image processor as claimed in claim 1, wherein the successively input pixel data comprise a plurality of color data necessary for color reproduction, and said random noise is generated for each color.

6. An image processor comprising:
a multilevel error diffusion processing unit comprising:
a quantizing unit that quantizes successively input pixel data based on output values distributed at predetermined tone differences;
a quantization error detecting unit that detects an error of quantization of the pixel data;
a peripheral error calculating unit that integrates the error of quantization of the pixel data detected by said quantization error detecting unit with respect to an error of quantization of peripheral pixel data; and
an error superimposing unit that feedback-adds an integration error calculated by said peripheral error calculating unit to pixel data input next;
a random noise generating unit that generates random noise in accordance with a tone level of the input pixel data; and
a noise superimposing unit that superimposes random noise generated by said random noise generating unit on the pixel data before multilevel error diffusion processing is performed on the pixel data by said multilevel error diffusion processing unit,
wherein for input pixel data, the random noise is generated, for each pixel data, with a noise component having a fixed amplitude component and a noise component whose amplitude is proportional to the tone level of the input pixel data.

7. An image processor as claimed in claim 6, wherein the successively input pixel data comprise a plurality of color data necessary for color reproduction, and said random noise is generated for each color.

8. An image processor as claimed in claim 6, further comprising:
a simply quantizing unit that quantizes pixel data on which the random noise is not superimposed; and
a selector that selects either one of multilevel-error-diffusion-processed pixel data and simply quantized pixel data in accordance with an attribute of the pixel data, and outputs the selected data as tone reproduction data.

9. An image processing method comprising the steps of:
quantizing successively input pixel data based on output values distributed at predetermined tone differences;
detecting an error of quantization of the pixel data;
integrating the detected error of quantization of the pixel data with respect to an error of quantization of peripheral pixel data;
feedback-adding the calculated integration error to pixel data input next;
generating random noise in accordance with a tone level of the input pixel data; and
superimposing the generated random noise on the pixel data before the pixel data is quantized,
wherein said quantizing unit quantizes the pixel data based on a plurality of reference levels so that tone reproduction data output to an outside has at least two tone levels,
wherein said reference levels are set so that a tone width of a plurality of areas divided based on the reference levels increases with the tone level and is narrow in a highlighted area where the tone level is highest.

10. A method for initiating program control in a system comprising:
quantizing successively input pixel data based on output values distributed at predetermined tone differences;
detecting an error of quantization of the pixel data;
integrating the detected error of quantization of the pixel data with respect to an error of quantization of peripheral pixel data;
feedback-adding the calculated integration error to pixel data input next;
generating random noise in accordance with a tone level of the input pixel data; and
superimposing the generated random noise on the pixel data before the pixel data is quantized,
wherein said quantizing quantizes the pixel data based on a plurality of reference levels so that tone reproduction data output to an outside has at least two tone levels,
wherein said reference levels are set so that a tone width of a plurality of areas divided based on the reference levels increases with the tone level and is narrow in a highlighted area where the tone level is highest.

* * * * *